(12) United States Patent
Cwajbaum (10) Patent No.: US 8,230,347 B2
(45) Date of Patent: Jul. 24, 2012

(54) SYSTEM AND METHOD FOR PROMPTING USERS TO SUBSCRIBE TO WEB FEEDS BASED ON WEB BROWSING ACTIVITY

(75) Inventor: Oscar R Cwajbaum, Sunnyvale, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 790 days.

(21) Appl. No.: 12/098,410

(22) Filed: Apr. 4, 2008

(65) Prior Publication Data

US 2009/0254856 A1 Oct. 8, 2009

(51) Int. Cl.
*G06F 3/00* (2006.01)
(52) U.S. Cl. ....................................................... 715/738
(58) Field of Classification Search .................. 715/738, 715/739, 745, 747
See application file for complete search history.

(56) References Cited

U.S. PATENT DOCUMENTS

| 2007/0225047 | A1* | 9/2007 | Bakos | 455/566 |
| 2008/0155112 | A1* | 6/2008 | Ma et al. | 709/231 |
| 2009/0222735 | A1* | 9/2009 | Clark et al. | 715/738 |

OTHER PUBLICATIONS

"Atom (standard)—Wikipedia, the free encyclopedia," Wikipedia, last modified Jan. 19, 2009, [Online] [Retrieved on Feb. 20, 2009] Retrieved from the Internet<URL:http://en.wikipedia.org/wiki/Atom_(standard)>.
"RSS—Wikipedia, the free encyclopedia," Wikipedia, last modified Feb. 20, 2009, [Online] [Retrieved on Feb. 20, 2009] Retrieved from the Internet<URL:http://en.wikipedia.org/wiki/RSS>.

* cited by examiner

*Primary Examiner* — Thanh Vu (57) ABSTRACT

A method (and corresponding system and computer program product) that prompts users for web feed subscription based on web browsing activities of the users is disclosed. The method monitors web browsing activities of a user related to a web page, and determines that the web page supports web feeds. Responsive to the user repeatedly visited the web page, the method determines whether the monitored web browsing activities related to the web page meets predetermined criteria. If so, the method prompts the user with options to subscribe to the web feed. If the user responds positively to the prompt, the method subscribes to the web feed.

20 Claims, 6 Drawing Sheets

SYSTEM AND METHOD FOR PROMPTING USERS TO SUBSCRIBE TO WEB FEEDS BASED ON WEB BROWSING ACTIVITY

BACKGROUND

1. Field of Disclosure

The disclosure generally relates to the field of content publication, in particular to accessing frequently updated content over a network.

2. Description of the Related Art

Mobile computing devices, such as smart phones, are increasing in usage. As a result, more and more mobile computing device users ("mobile users") use their mobile computing devices to browse web content. Mobile computing devices generally have smaller keyboards and displays than traditional computers. In addition, their mobility sometimes restricts network connectivity. These restrictions tend to hamper mobile web browsing user experience.

One approach to improve the mobile web browsing user experience is to utilize web feeds such as Really Simple Syndication (RSS, or RDF Site Summary or Rich Site Summary). A web feed is a data format used for providing a summary of contents on a website or a portion of the website. The two main web feed formats are RSS feed and Atom feed. Most major news websites and blogs support both web feeds formats. A user subscribes to a web feed, and thereafter receives summaries of updated content when updating takes place in the subscribed web feed. Typically, users use feed reader applications (also called aggregators) to subscribe to web feeds and view their content. Web feeds enables mobile users to keep up with their favorite websites in an automated manner that is easier than checking them manually.

Despite these advantages and ease of use, web feeds are not widely used, even by those regularly visiting websites that support web feeds. Currently, many web browsers place a web feed icon on the address bar to indicate to the user that the currently displayed web page supports web feeds. However, most viewers continue to ignore the indicators, and thus, do not utilize web feeds.

Hence, there is lacking, inter alia, a system and method for prompting users to subscribe to a web feed based on the web browsing activities of the users.

SUMMARY

Embodiments of the present disclosure include a method (and corresponding system and computer program product) that prompts users for web feed subscription based on web browsing activities of the users. The method monitors web browsing activities of a user related to a web page, and determines that the web page supports web feeds. Responsive to the user repeatedly visited the web page, the method determines whether the monitored web browsing activities related to the web page meets predetermined criteria. If so, the method prompts the user with options to subscribe to the web feed. If the user responds positively to the prompt, the method subscribes to the web feed.

Advantages of the disclosed method include user friendly prompts for web feed subscription. The disclosed method monitors user browse activities and only prompts for web feed subscription when it is likely that such a subscription will benefit the user.

The features and advantages described in the specification are not all inclusive and, in particular, many additional features and advantages will be apparent to one of ordinary skill in the art in view of the drawings, specification, and claims.

Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying drawings (figures). A brief description of the drawings is as follows:

DETAILED DESCRIPTION

The disclosed embodiments describe examples of a method (and corresponding system and computer program product) for prompting users to subscribe to web feeds based on web browsing activities of the users. As described herein, a web feed is a data format used for providing a summary of contents on a website or a portion of the website. By using the summary provided by a web feed and/or by comparing the summary of a web feed at the present time to its summary in the past, applications can easily determine whether new contents become available on the corresponding website without checking each webpage on the website. Web feeds include, for example, RSS feeds and Atom feeds. For purposes of illustration, the method (and corresponding system and computer program product) is described in terms of prompting mobile users to subscribe to RSS feeds, even though the disclosed embodiments applies to all other types of web feeds as defined above.

The figures and the following description relate to preferred embodiments by way of illustration only. Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. It should be noted that from the following discussion, alternate embodiments of the structures and methods disclosed herein will be readily recognized by one skilled in the art as viable alternatives that may be employed without departing from the principles described herein.

Example Mobile Computing Device

Figure 1:
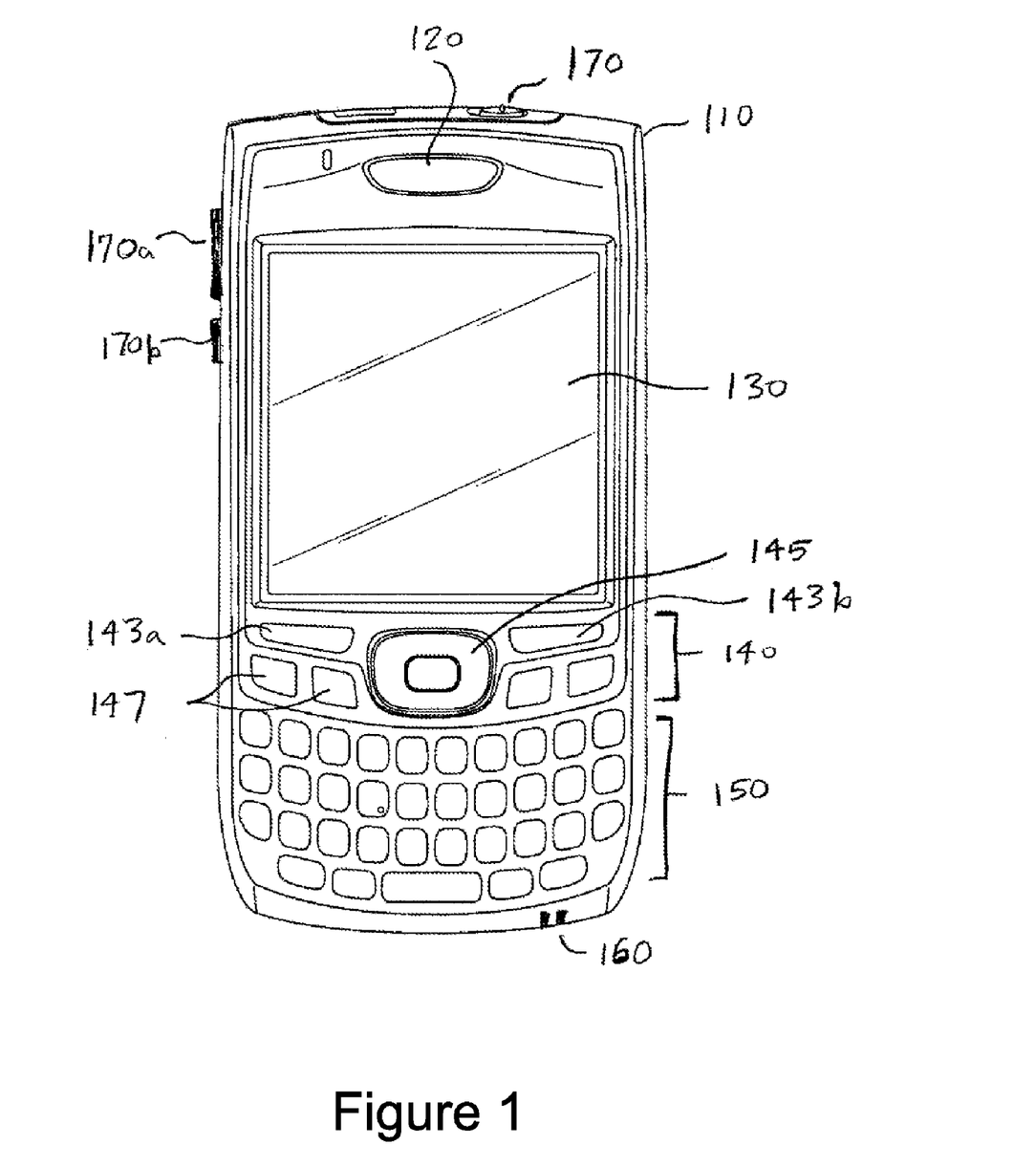
FIG. 1 illustrates one embodiment of a mobile computing device.

FIG. 1 illustrates one embodiment of a mobile computing device 110 with telephonic functionality, e.g., a mobile phone or a smartphone. The mobile computing device is configured to host and execute a phone application for placing and receiving telephone calls. It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) or data networks having voice over internet protocol (VoIP) functionality. Moreover, the principles disclosed herein may also be applied to other devices, such as personal digital assistants (PDAs), media players and other similar devices.

The mobile computing device 110 is configured to be of a form factor that is convenient to hold in a user's hand, for example, a personal digital assistant (PDA) or a smart phone form factor. For example, in one embodiment the mobile computing device 110 can have dimensions ranging from 7.5 to 15.5 centimeters in length, 5 to 12.75 centimeters in width, 0.64 to 2.2 centimeters in height and weigh between 55 and 230 grams.

The mobile computing device 110 includes a speaker 120, a screen 130, a navigation area 140, a keypad area 150, and a microphone 160. The mobile computing device 110 also may include one or more switches 170, 170a, 170b (generally 170). The one or more switches 170 may be buttons, sliders, or rocker switches and can be mechanical or solid state (e.g., touch sensitive solid state switch).

The screen 130 of the mobile computing device 110 is, for example, a 240×240, a 320×320, or a 320×480 transflective display. For example, the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 130 further comprises a touch-sensitive display (e.g., pressure-sensitive (resistive), electrically sensitive (capacitive), acoustically sensitive (SAW or surface acoustic wave), photo-sensitive (infrared)) including a digitizer for receiving input data, commands or information from a user. The user may use a stylus, a finger or another suitable input device for data entry, such as selecting from a menu or entering text data.

The navigation area 140 is configured to control functions of an application executing in the mobile computing device 110 and visible through the screen 130. For example, the navigation area includes an x-way (x is, e.g., 5) navigation ring (or joystick) 145 that provides cursor control, selection, and similar functionality. In addition, the navigation area 140 may include selection buttons 143a, 143b to select functions viewed just above the buttons on the screen 130. In addition, the navigation area 140 also may include dedicated function buttons 147 for functions such as, for example, a calendar, a web browser, an e-mail client or a home screen. In this example, the navigation ring 145 may be implemented through mechanical, solid state switches, dials, or a combination thereof. The keypad area 150 may be a numeric keypad (e.g., a dial pad) or a numeric keypad integrated with an alpha or alphanumeric keypad (e.g., a keyboard with consecutive keys of QWERTY, AZERTY, or other equivalent set of keys on a keyboard or a Dvorak keyboard).

Although not illustrated, it is noted that the mobile computing device 110 also may include an expansion slot (not shown). The expansion slot is configured to receive and support expansion cards (or media cards), which may include memory cards such as CompactFlash™ cards, SD cards, XD cards, Memory Sticks™, MultiMediaCard™, SDIO, and the like.

The mobile computing device 110 may also include a connector (not shown in FIG. 1) for connections with external computing devices, such as a desktop computer. The connection may be wired (e.g., via a Universal Serial Bus (USB) connection) or wireless (e.g., via a Bluetooth connection). The desktop computer can access and modify data stored in the mobile computing device 110 (e.g. data stored in integrated or embedded storage devices or in expansion cards) through the connection.

Example Mobile Computing Device Architectural Overview

Figure 2:
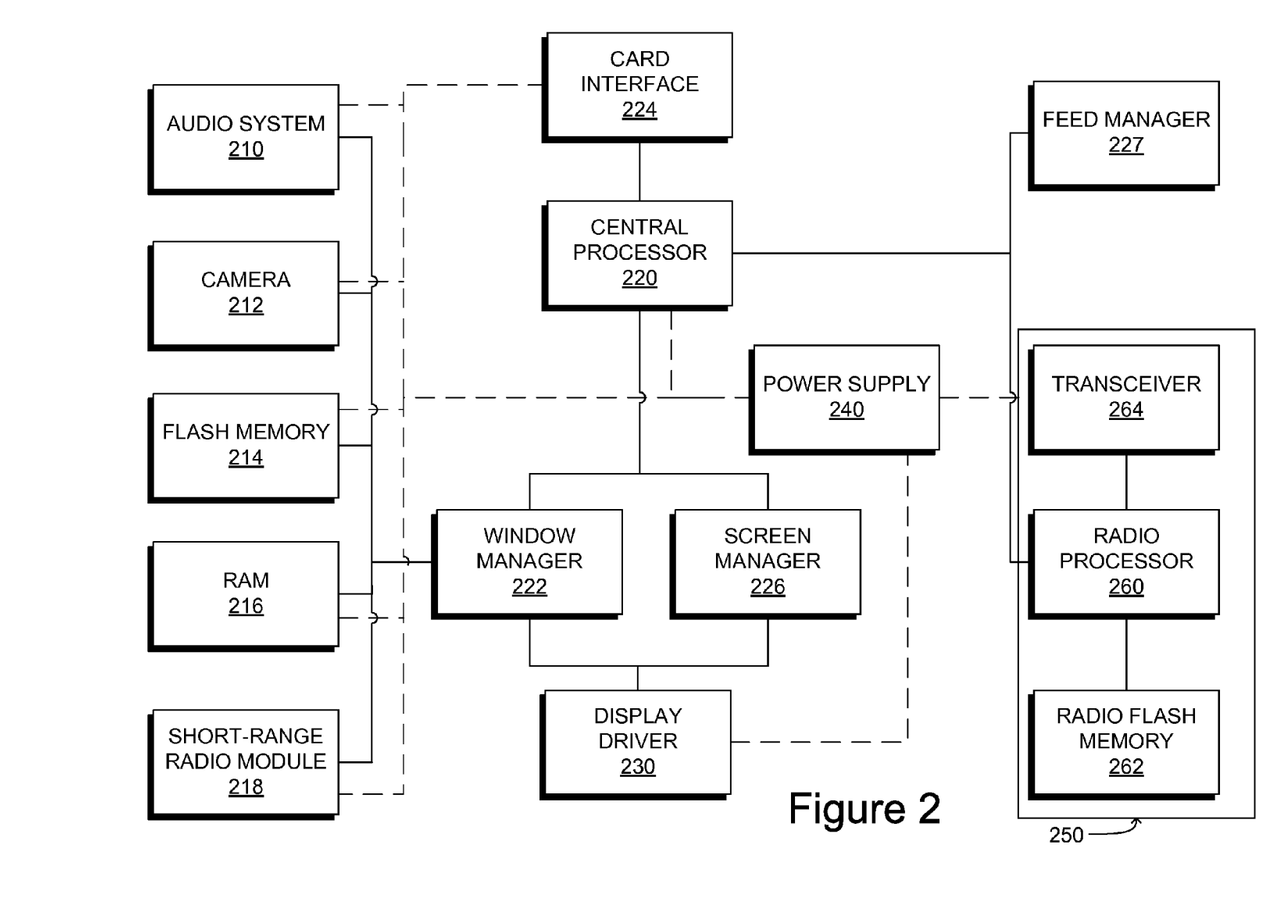
FIG. 2 illustrates one embodiment of an architecture of a mobile computing device.

Referring next to FIG. 2, a block diagram illustrates one embodiment of an architecture of a mobile computing device 110 with telephonic functionality. By way of example, the architecture illustrated in FIG. 2 will be described with respect to the mobile computing device of FIG. 1. The mobile computing device 110 includes a central processor 220, a power supply 240, and a radio subsystem 250. The central processor 220 communicatively couples with: an audio system 210, a camera 212, a flash memory 214, a random-access memory (RAM) 216, a short range radio module 218 (e.g., Bluetooth, Wireless Fidelity (WiFi) component), a window manager 222, a screen manager 226, and a feed manager 227. The power supply 240 powers the central processor 220, the radio subsystem 250 and a display driver 230 (which may be contact- or inductive-sensitive). The power supply 240 may correspond to a battery pack (e.g., rechargeable) or a power-line connection or component.

In one embodiment, the window manager 222 comprises a software and/or firmware instructions for processes that initialize a virtual display space stored in the RAM 216 and/or the flash memory 214. The virtual display space includes one or more applications currently being executed by a user and the current status of the executed applications. The window manager 222 receives requests, from user input or from software and/or firmware processes, to show a window and determines the initial position of the requested window. Additionally, the window manager 222 receives commands or instructions to display and modify a window, such as resizing the window along one axis, moving the window along one axis or any other command altering the appearance or position of the window, and modifies the window accordingly.

The screen manager 226 comprises a software and/or firmware instructions for processes that manage content displayed on the screen 130. In one embodiment, the screen manager 226 monitors and controls the physical location of data displayed on the screen 130 and which data is displayed on the screen 130. The screen manager 226 alters or updates the location of data on the screen 130 responsive to input from the central processor 220, to modify the screen 130 appearance. In one embodiment, the screen manager 226 also monitors and controls screen brightness and transmits control signals to the central processor 220 to modify screen brightness and power usage to the screen 130.

The radio subsystem 250 includes a radio processor 260, a radio memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120. The transmitter portion of the transceiver 264 communicatively couples a radio signal output of the device 110, e.g., the antenna, where communication signals are transmitted to an established (e.g., a connected (or coupled)

or active) call. The communication signals for transmission include voice, e.g., received through the microphone 160 of the device 110, (or other sound signals) that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, multiple Access (CDMA system), and a Universal Mobile Telecommunications System (UMTS). Examples of data networks include General Packet Radio Service (GPRS), third-generation (3G) mobile, High Speed Download Packet Access (HSDPA), and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using a serial line 278.

The card interface 224 is adapted to communicate with the expansion slot (not shown). The card interface 224 transmits data and/or instructions between the central processor 220 and an expansion card or media card included in the expansion slot. The card interface 224 also transmits control signals from the central processor 220 to the expansion slot to configure an expansion card or media card included in the expansion slot. In one embodiment, the card interface 224 works with the storage driver 227 in order to transmit data and/or instructions to and/or from the expansion card or media card included in the expansion slot.

In one embodiment, central processor 220 executes logic (by way of programming, code, instructions) corresponding to executing applications interfaced through, for example, the navigation area 140 or switches 170. It is noted that numerous other components and variations are possible to the hardware architecture of the computing device 200, thus an embodiment such as shown by FIG. 2 is just illustrative of one implementation for an embodiment.

The feed manager 227 comprises a software and/or firmware instructions for processes that prompt a user of the mobile computing device 110 for a web feed subscription based on the web browsing activities of the user. The feed manager 227 monitors web pages visited by the user to determine whether to prompt the user for a web feed subscription to those web pages that support web feeds. The feed manager 227 prompts the user to subscribe to a web feed and, based on user response, subscribes to the web feed. The feed manager 227 also manages feed subscriptions and aggregates content received from multiple subscribed web feeds for easy user viewing. An example architecture of the feed manager 227 is described in detail below with respect to FIG. 3.

Example Feed Manager Architecture Overview

Figure 3:
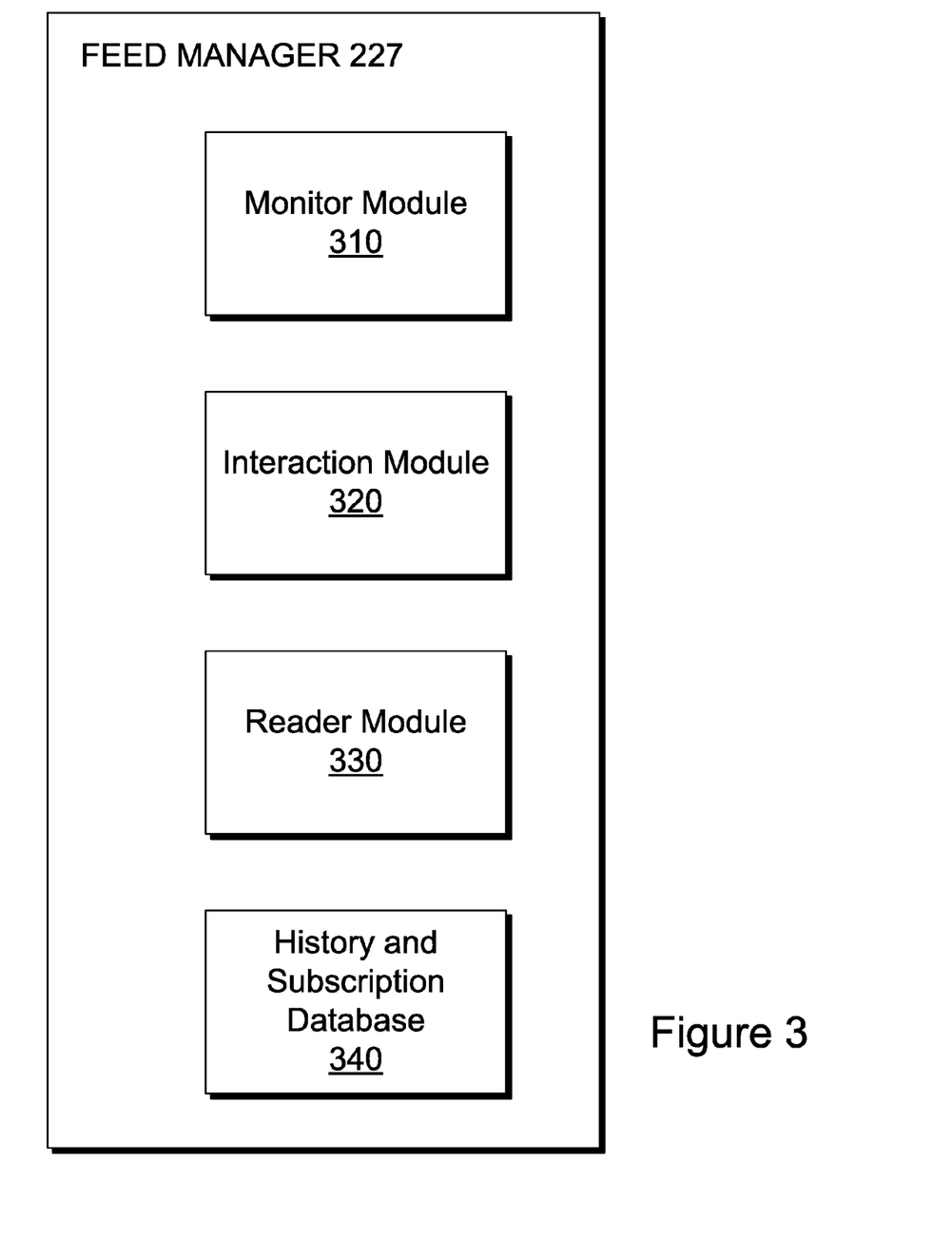
FIG. 3 illustrates one embodiment of an architecture of a feed manager in the mobile computing device shown in FIG. 2.

FIG. 3 is a high-level block diagram illustrating one embodiment of modules (software, hardware, and/or firmware) within the feed manager 227 in the mobile computing device 110. As illustrated, the feed manager 227 includes a monitor module 310, an interaction module 320, a reader module 330, and a history and subscription database 340. In one embodiment, the components of the feed manager 227 are communicatively coupled with each other. Those of skill in the art will recognize that other embodiments can have additional modules than those shown in FIG. 3. Likewise, the functionalities of each module can be distributed among the modules in a manner different than described herein (e.g., combining functionalities of different modules).

The monitor module 310 comprises a software and/or firmware instructions for processes that monitor browsing activities of a user. The monitor module 310 tracks the web pages (and/or websites) the user visits and the frequency of such visits. The monitor module 310 also detects whether the visited web pages support web feeds. In one embodiment, the monitor module 310 stores this information in the history and subscription database 340.

The interaction module 320 comprises a software and/or firmware instructions for processes that prompt the user for web feed subscription. When the user visits a web page supporting web feeds, the interaction module 320 solicits subscription to such web feeds by displaying a visual component such as an overlay text banner or a pop-up dialog. The visual component contains language explaining web feeds in lay-person's terms and provides controls (e.g., buttons) for the user to interact with. The user may interact with the interaction module 320 through the visual component to subscribe to a web feed, and/or to customize the subscription or the prompting mechanism.

The reader module 330 comprises a software and/or firmware instructions for processes that retrieve (or receive) content from multiple subscribed web feeds and aggregate the subscribed content for easy user viewing (e.g., display the content in a single display). The user may also interact with the reader module 330 to manage the subscribed web feeds and the retrieved feed content. For example, the user may configure the reader module 330 to configure how the subscribed web feed content is retrieved. The user may specify a time (e.g., between 8 PM and 6 AM) and/or a particular network connection (e.g., cellular network or WIFI network) for the reader module 330 to retrieve the subscribed web feed content.

The history and subscription database 340 comprises a software and/or firmware instructions for processes that store and maintain user browsing activities, web feed subscriptions, and/or user configuration information for the feed manager 227. In one embodiment, the stored user browsing activities include addresses of the web pages visited (e.g., their Uniform Resource Locator (URL)), time of such visits, whether the web pages support web feeds, whether the user is prompted for web feed subscription, the manner of the prompt, and the user's response to the prompt.

In one embodiment, some or all components of the feed manager 227 may be embedded in (or integrated with) browser applications (e.g., Palm Blazer™, Opera mobile browser, Microsoft Internet Explorer™, Mozilla Firefox™, or Apple Safari™), and/or utilize functionalities provided by the browser applications. For example, the monitor module 310 may use the browsing history maintained by the browser applications to track the browsing activities of the user, and utilize the web feed detection mechanism of the browser application to determine whether a certain web page supports web feeds.

Overview of Methodology

Figure 4:
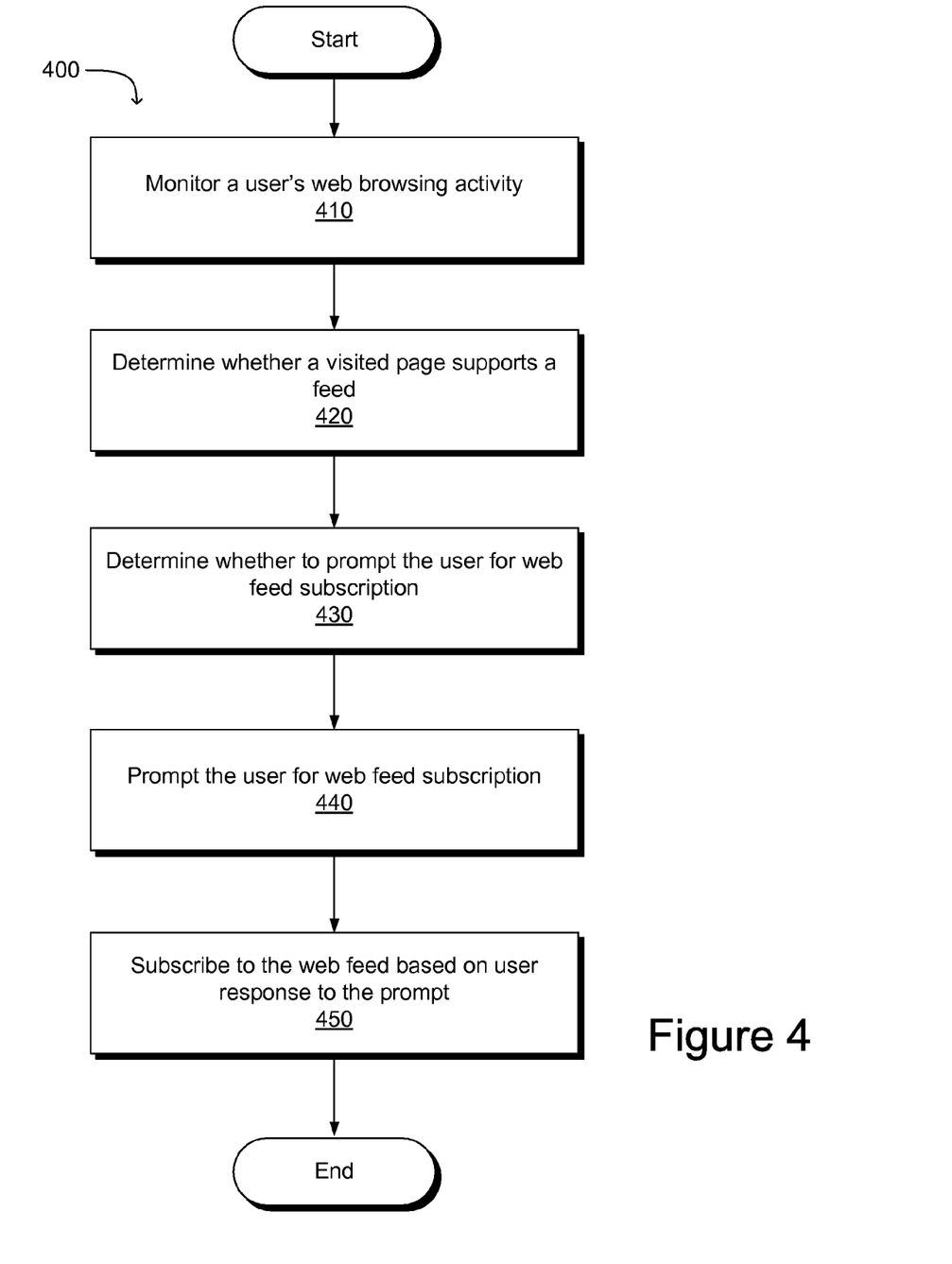
FIG. 4 is a flowchart illustrating an example method for prompting users to subscribe to a web feed based on web browsing activities of the users.

FIG. 4 is a flowchart illustrating one embodiment of a method (or process) 400 for prompting users to subscribe to a web feed based on web browsing activities of the users. In one embodiment, the method 400 is implemented in a computing device such as the mobile computing device 110. One or more portions of the method 400 may be implemented in embodiments of hardware, firmware, and/or software or combinations thereof. For example, the method 400 may be embodied through instructions for performing the actions described herein and such instrumentations can be stored within a tangible computer readable medium, e.g., the flash memory 214 or the RAM 216, and are executable by a processor, e.g., the central processor 220. Furthermore, those of skill in the art will recognize that other embodiments can perform the steps of the method 400 in different orders. Moreover, other embodiments can include different and/or additional steps than the ones described herein.

The method 400 starts with the mobile computing device 110 monitoring 410 user web browsing activities (e.g., through the monitor module 310 of the feed manager 227). In one embodiment, the monitor module 310 tracks the URL of the web pages visited, the number of visits, and/or the time and date of such visits. The monitor module 310 stores the tracked information in the history and subscription database 340.

The mobile computing device 110 determines 420 whether a currently visited web page supports web feeds (e.g., through the monitor module 310). In one embodiment, the monitor module 310 makes such a determination by parsing the content of the web page for related tags (e.g., HTML script tags). For example, if the headers of a web page include tags such as "<LINK REL="alternate" TYPE="application/rss+xml"...>" then the monitor module 310 determines 420 that the web page supports web feeds.

If the currently visited web page supports web feeds, the mobile computing device 110 determines 430 whether to prompt the user for subscription to the web feeds (e.g., through the interaction module 320). In one embodiment, the interaction module 320 makes the determination 430 based on one or more criteria. The criteria may include past user visits to the web page (or related web pages, such as web pages from the same website). For example, if the user has viewed the current web page multiple times in the past week, the interaction module 320 determines that the user has a strong interest in the web page, and determines 430 to prompt for web feeds subscription. Other examples of the criteria include only prompting for subscription if the webpage supports a specific web feed format (e.g., RSS feed or Atom feed). The interaction module 320 may check current web feed subscriptions, and only prompt for web feeds not currently subscribed. The criteria may be preconfigured (e.g., by provider of the mobile computing device 110) and/or customized by the user.

Based on the determination 430, the mobile computing device 110 prompts 440 the user for web feed subscription (e.g., through the interaction module 320). In one embodiment, the interaction module 320 displays a visual component with content soliciting user subscription and controls for the user to interact with. In one embodiment, the interaction module 320 may display different visual components based on user responses. For example, initially the interaction module 320 overlays a text banner on the bottom of the current web page. If the user repeatedly ignores the text banner, the interaction module 320 displays a pop-up dialog soliciting web feed subscription.

The mobile computing device 110 subscribes 450 to the web feed based on a positive user response to the prompt (e.g., through the reader module 330). Specifically, if the user responds to the prompted subscription solicitation positively, the reader module 330 subscribes 450 to the web feed and adds it to the subscription list in the history and subscription database 340.

Example Process

Figure 5A:
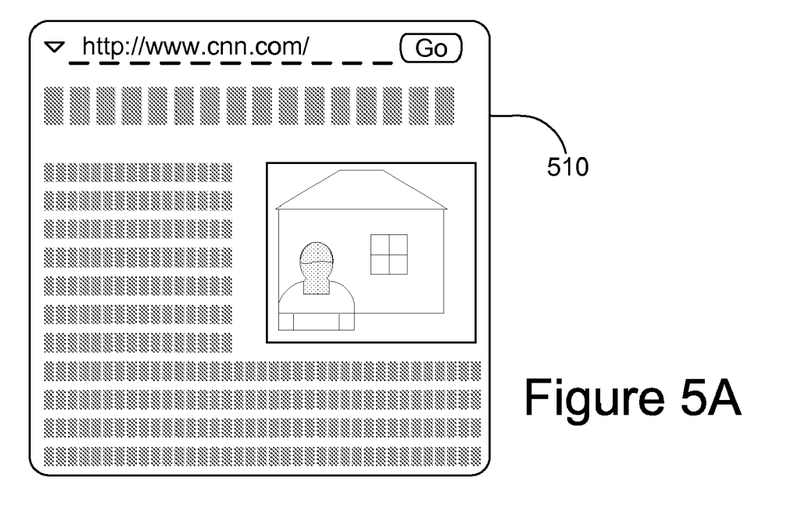
FIGS. 5A through 5D are screenshots illustrating an example process for prompting a mobile user to subscribe to a web feed based on the web browsing activities of the user.

FIGS. 5A through 5D illustrate an example process for prompting a user of a mobile computing device to subscribe to a web feed based on the web browsing activities of the user through the principles disclosed herein. In this example, the user uses a mobile computing device to browse a web page that supports an RSS feed. FIGS. 5A through 5D are a series of screenshots of the mobile computing device as the example process progresses, according to one embodiment disclosed herein. Screenshots are ordered chronologically for this example, with those recorded earlier placed on top. For example, screenshot in FIG. 5A is recorded earlier than the one in FIG. 5B. In this example, the mobile computing device is the mobile computing device 110 illustrated in FIG. 1.

The user uses the mobile computing device 110 to browse news websites regularly, for example, during a regular commuter rail ride to and from work. As illustrated in FIG. 5A, a screenshot 510 illustrates the display on the mobile computing device 110 when it displays a web page from the news website CNN.com to the user. The mobile computing device 110 monitors 410 this browsing activities, and determines 420 that the displayed CNN.com web page supports RSS feed.

Figure 5B:
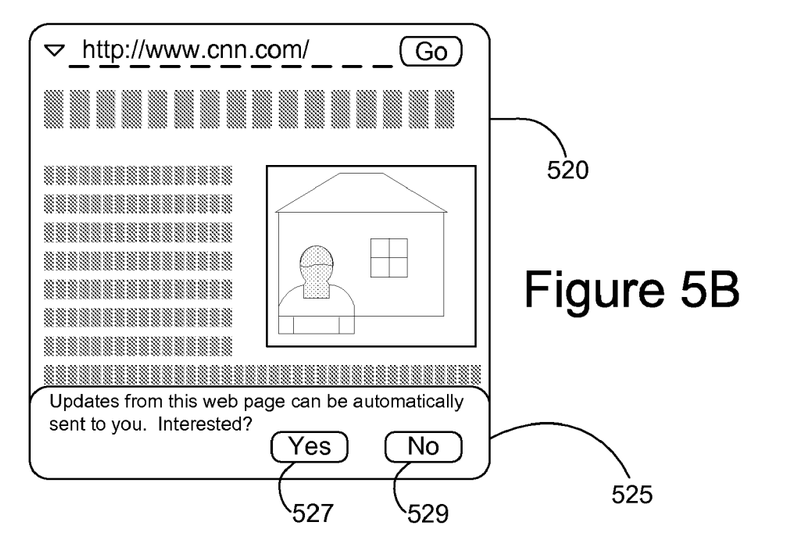

When the user visits the CNN.com web page, the mobile computing device 110 determines 430 whether to prompt for web feed subscription. For example, the mobile computing device 110 detects that the user has visited the CNN.com web page daily for the past three days, and determines 430 to prompt for web feed subscription. The mobile computing device prompts 440 the user by overlaying a text banner with content soliciting for web feed subscription. As illustrated in FIG. 5B, a text banner 525 is overlaid on the bottom of the CNN.com web page in a screenshot 520. The text banner 525 recites "Updates from this web page can be automatically sent to you. Interested?" and includes a "Yes" button 527 and a "No" button 529 for the user to select. If the user selects the "Yes" button 527 (e.g., via a keyboard, a switch, or a touch sensitive screen), the mobile computing device 110 determines that the user is interested in subscribing to the web feed and subscribes 450 to it. If the user selects the "No" button 529, the mobile computing device 110 determines that the user is not interested in subscribing to the web feed, and hides the text banner 525, such that the user can view the web page in a manner similar to the screenshot in FIG. 5A. In one embodiment, the user can also ignore the text banner 525 without selecting either buttons 527, 529.

Figure 5C:
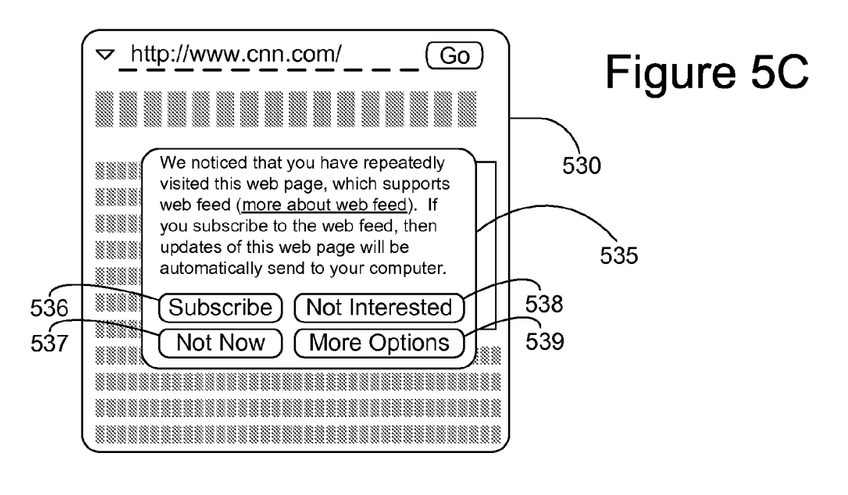

If the user repeatedly ignores the text banner 525 by not selecting the buttons 527, 529, the mobile computing device 110 may display a more prominent pop-up dialog soliciting for web feed subscription when the user subsequently revisits the CNN.com web page. As illustrated in FIG. 5C, a dialog 535 is displayed on top of the CNN.com web page in a screenshot 530. The dialog 535 recites "We noticed that you have repeatedly visited this web page, which supports web feed (more about web feed). If you subscribe to the web feed, then updates of this web page will be automatically send to your computer." and includes four buttons "Subscribe" 536, "Not Now" 537, "Not Interested" 538, and "More Options" 539 for the user to select. The user may select the underlined "more about web feed" for further information about web feeds. Responding to this user selection, the mobile computing device 110 will display a brief description of web feeds in layperson's terms. If the user selects the "Subscribe" button 536, the mobile computing device 110 determines that the user is interested in subscribing to the web feed and subscribes 450 to it. If the user selects the "Not Now" button 537, the mobile computing device 110 will hide the dialog 535, and prompts the user again when the user revisit this web page. If the user selects the "Not Interested" button 529, the mobile computing device 110 determines that the user is not interested in subscribing to the web feed, and hides the dialog 535, such that the user can view the web page in a manner similar to the screenshot in FIG. 5A. In addition, responding to the user selecting the "Not Interested" button 538, the mobile computing device 110 will no longer prompt for web feed subscription for this web page. If the user selects "More Options" button 539, the mobile computing device 110 will provide more options for the user to select from. For example, the user may choose to turn off the web feed subscription prompt mechanism for all or some websites permanently (or for a determinable period of time).

Figure 5D:
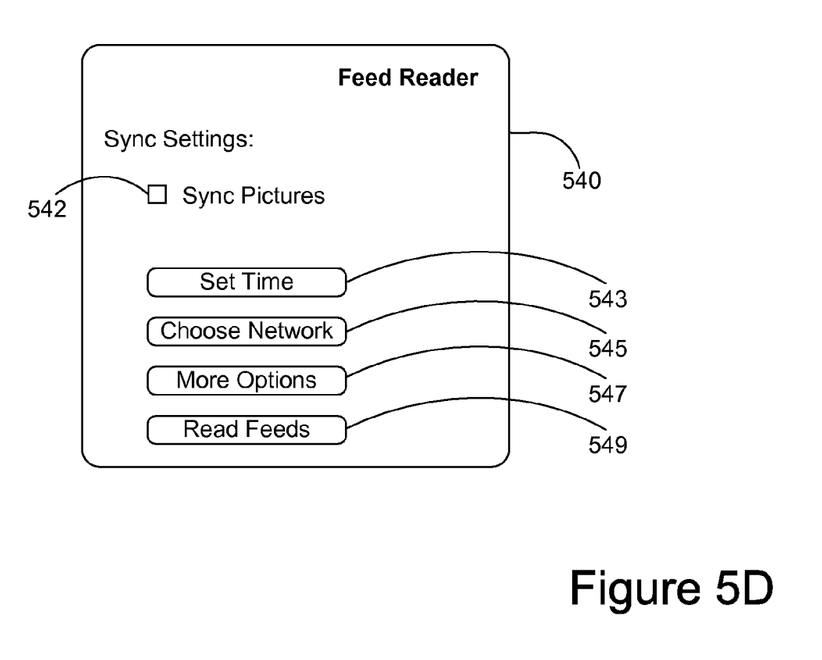

If the user selects a button 527, 536 that indicates an interest in subscribing to the web feed. The mobile computing device 110 may bring up a feed reader (e.g., the reader module 330) for the user to configure the subscription. As illustrated in FIG. 5D, a feed reader application was brought up by the mobile computing device 110. A screenshot 540 of the feed reader includes a checkbox 542 that recites "Sync Pictures," a "Set Time" button 543, a "Choose Network" button 545, a "More Option" button 547, and a "Read Feeds" button 549. The user can choose to retrieve pictures from the web feed by selecting the check box 542. The user can select the "Set Time" button 543 to set the synchronization time, select the "Choose Network" button 545 to select a network connection for retrieving the web feed updates, select the "More Options" button 547 to select other user configurations related to the feed reader, and select the "Read Feeds" button 549 to review the subscribed web feed contents already retrieved.

Alternate Embodiments and Additional Configuration Details

In one embodiment, a web page can support several web feeds. When a user visits such a web page, the mobile computing device can prompt the user with the supported web feeds and ask the user to make a selection for interested web feed(s). Alternatively, the mobile computing device can prompt the user for a subscription to the first web feed, or the web feed the user is more likely interested in based on the user's past behavior (e.g., other web feeds subscribed).

The disclosed embodiments advantageously prompt mobile users to take advantages of web feeds based on web browsing activities of the users. The disclosed embodiments monitor user browse activities and only prompt for web feed subscription when it is likely that such a subscription will benefit the user. The disclosed embodiments also provide user-friendly information to assist the user to determine whether to subscribe to web feeds.

Some portions of above description describe the embodiments in terms of algorithmic processes or operations, for example, the processes and operations as described with FIGS. 3 and 4. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for prompting users to subscribe to a web feed based on web browsing activities of the users. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for prompting a user of a mobile computing device to subscribe to a web feed, the mobile computing device configured for connecting with mobile telephone network, the method comprising:
   monitoring web browsing activities of the user related to a web page;
   determining that the web page supports a web feed;
   responsive to the user visiting the web page a predetermined number of times in a predetermined duration of time, determining whether the monitored web browsing activities meets predetermined criteria;
   responsive to the monitored web browsing activities being determined meeting the predetermined criteria, prompting the user with options to subscribe to the web feed, comprising:
      displaying a banner for soliciting web feed subscription when the user visits the web page, and responsive to the user ignoring the banner, displaying a pop-up dialog for soliciting web feed subscription during a subsequent visit to the web page by the user; and responsive to receiving a response to subscribe from the user to the prompt, subscribing to the web feed.

2. The method of claim 1, wherein the mobile computing device is a smart phone.

3. The method of claim 2, wherein the selectable option enables the user to choose a network connection for retrieving updates of the web feed.

4. The method of claim 2, wherein the selectable option enables the user to set a time for retrieving updates of the web feed.

5. The method of claim 1, wherein the web feed consists one of a RSS feed and an Atom feed.

6. The method of claim 1, wherein the pop-up dialog is displayed during a subsequent visit to the web page by the user responsive to the user repeatedly ignoring the banner.

7. The method of claim 1, wherein the pop-up dialog comprises a selectable option for the user to customize the subscription to the web feed.

8. The method of claim 1, wherein the banner comprises a first selectable option for subscribing to the web feed and a second selectable option for not subscribing to the web feed.

9. A computer readable medium with stored instructions, the instructions when executed by a processor of a computing device cause the processor to perform a method comprising:
monitoring web browsing activities of a user related to a web page;
determining that the web page supports a web feed;
responsive to the user visiting the web page a predetermined number of times in a predetermined duration of time, determining whether the monitored web browsing activities related to the web page meets predetermined criteria;
responsive to the monitored web browsing activities related to the web page meeting the predetermined criteria, prompting the user with options to subscribe to the web feed, comprising:
displaying a banner for soliciting web feed subscription when the user visits the web page, and
responsive to the user ignoring the banner, displaying a pop-up dialog for soliciting web feed subscription during a subsequent visit to the web page by the user; and
responsive to receiving a response to subscribe from the user to the prompt, subscribing to the web feed.

10. The computer readable medium of claim 9, wherein the computing device is a mobile computing device.

11. The computer readable medium of claim 10, wherein the mobile computing device is a smart phone.

12. The computer readable medium of claim 9, wherein the web feed consists one of a RSS feed and an Atom feed.

13. The computer readable medium of claim 9, wherein the pop-up dialog comprises a selectable option for the user to customize the subscription to the web feed.

14. The computer readable medium of claim 9, wherein the pop-up dialog is displayed during a subsequent visit to the web page by the user responsive to the user repeatedly ignoring the banner.

15. A computing device, comprising:
a computer processor;
a monitor module configured for monitoring web browsing activities of a user related to a web page, for storing monitored information in a history and subscription database, and for determining that the web page supports a web feed;
an interaction module configured for determining whether the monitored web browsing activities related to the web page meets predetermined criteria responsive to the user visiting the web page a predetermined number of times in a predetermined duration of time, and for prompting the user with options to subscribe to the web feed responsive to the monitored web browsing activities related to the web page meeting the predetermined criteria that comprises: (1) displaying a banner for soliciting web feed subscription when the user visits the web page, and (2) responsive to the user ignoring the banner, displaying a pop-up dialog for soliciting web feed subscription during a subsequent visit to the web page by the user; and
a reader module configured for subscribing to the web feed responsive to receiving a response to subscribe from the user to the prompt, and storing subscribing information in the history and subscription database.

16. The computing device of claim 15, wherein the computing device is a mobile computing device.

17. The computing device of claim 16, wherein the mobile computing device is a smart phone.

18. The computing device of claim 15, wherein the web feed consists one of a RSS feed and an Atom feed.

19. The computing device of claim 15, wherein the pop-up dialog comprises a selectable option for the user to customize the subscription to the web feed.

20. The computing device of claim 15, wherein the pop-up dialog is displayed during a subsequent visit to the web page by the user responsive to the user repeatedly ignoring the banner.

* * * * *